Oct. 8, 1963 H. G. LUBSZYNSKI 3,106,488

IMPROVED METHOD OF FORMING A PHOTO-CONDUCTIVE LAYER ON A TRANSLUCENT SURFACE

Original Filed Feb. 6, 1956

United States Patent Office 3,106,488
Patented Oct. 8, 1963

3,106,488

IMPROVED METHOD OF FORMING A PHOTO-CONDUCTIVE LAYER ON A TRANSLUCENT SURFACE

Hans Gerhard Lubszynski, Lawrence, England, assignor to Electric & Musical Industries Limited, Hayes, Middlesex, England, a company of Great Britain
Original application Feb. 6, 1956, Ser. No. 563,800, now Patent No. 3,015,746, dated Jan. 2, 1962. Divided and this application Feb. 19, 1960, Ser. No. 15,512
Claims priority, application Great Britain Feb. 15, 1955
7 Claims. (Cl. 117—215)

The present invention relates to photo-sensitive devices employing photo-conductive layers and to an improved method of forming such layers.

A very important factor of photo-conductive layers which can be employed as the target in television pick-up tubes is the photo-conductive lag and colour response of the layer and such lag and colour response depends to a large extent on the constitution and the thickness of this layer.

It has already been proposed to form a photo-sensitive device in which a photo-conductive layer of antimony tri-sulphide is deposited on a support by evaporating the material in a gas atmosphere so that the deposited layer has a porous or spongy nature. The advantage of such a layer is that it has a low capacitance and a short photo-conductive lag. However it has the disadvantage of poor sensitivity and a low colour response at the red end of the spectrum.

It has also been proposed to form a photo-sensitive device in which a photo-conductive layer of antimony tri-sulphide is deposited on a support by evaporation of the material in a vacuum so as to form thereon a solid layer of the material. Such a device has the advantage of high sensitivity and a very good overall colour response particularly at the red end of the spectrum. However, such a layer has the disadvantage of a high capacitance and a long photo-conductive lag.

It is an object of the present invention to provide a photo-sensitive device having an improved photo-conductive layer which has high sensitivity, a low capacitance and short photo-conductive lag, and a good overall colour response.

It is a further object of the invention to provide an improved method for depositing photo-conductive layers and for controlling the thickness of such layers.

According to the invention there is provided a method of forming in a device a photo-conductive layer on the surface of a support formed of translucent insulating material, comprising providing within said device a metal mesh electrode adjacent to and facing said support surface, an evaporator containing photo-conductive material arranged facing the side of said mesh remote from said support, introducing a gas into said device at such a pressure and heating said evaporator to cause said material to be evaporated and to deposit on said mesh and said support surface as a porous layer, evacuating said device and then heating said mesh to cause the porous deposit thereon to be re-evaporated and to deposit on said support a solid layer of said material over said porous layer.

Preferably said photo-conductive material comprises antimony tri-sulphide.

Figure 1:
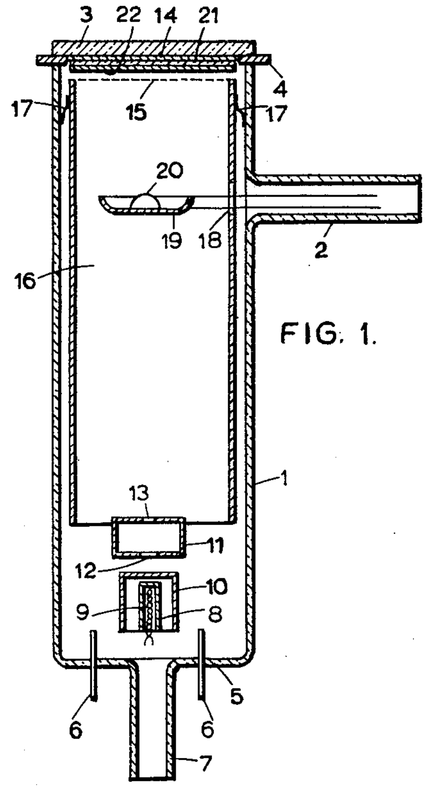
Figure 2:
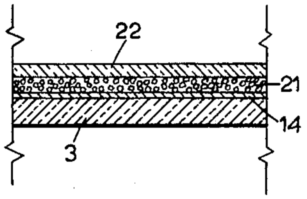
Figure 3:
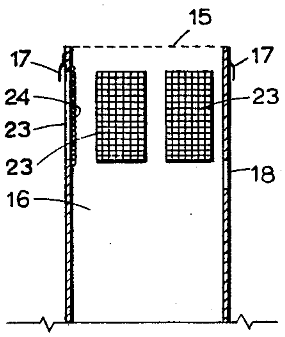
Figure 4:
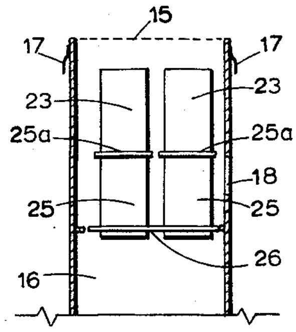
Figure 5:
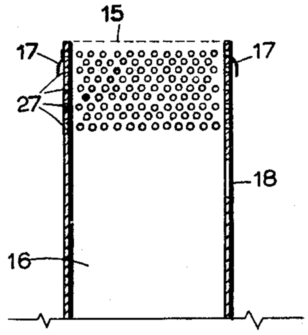

In order that the invention may be clearly understood and readily carried into effect, various embodiments of same shown applied to the construction television pick-up tubes will now be described with reference to the accompanying drawings, in which:

FIGURE 1 illustrates a sectional view of one form of such a tube embodying a photo-sensitive layer according to the invention, FIGURE 2 is an enlarged view of a portion of this layer, and FIGURES 3, 4 and 5 each show alternative constructions for the electrode supporting the mesh shown in FIGURE 1.

Referring to FIGURE 1 there is shown a tubular glass envelope 1 having a side tube 2 and at one end an optical window 3 hermetically sealed to the envelope 1 via a metal ring 4 said window 3 forming as decribed later, the support for a photo-sensitive layer. At the other end of the envelope 1 there is provided a glass base 5 having metal contact members 6 hermetically sealed therethrough and arranged as a circular array around a pump stem 7. Supported from the members 6 within the envelope is an electron gun which as shown comprises a thermionic cathode 8 with its associated heating element 9 an apertured grid electrode 10 operated with a negative potential of 0–100 volts with respect to cathode 8. The grid 10 is followed by an anode electrode 11 said anode 11 having spaced apart apertures 12, 13 of different diameters to reduce the lateral components of the beam in known manner and which is operated at a potential of 300 volts positive with respect to cathode 8. The inner surface of the window 3 is provided with a substantially transparent electrically conducing coating 14 preferably by spraying over the surface of the window whilst hot a solution of a tin salt said coating 14 being electrically connected to the ring 4 and serving in operation of the device as a signal electrode and to which is applied a potential which may be up to 150 volts positive with respect to the operating potential of the cathode 8 which in a low velocity tube is maintained at zero volts.

Adjacent to and facing the coating 14 but at a slight distance therefrom there is provided a metal mesh electrode 15 carried by a metal cylinder 16 having means 17 for locating it within the envelope 1 and an aperture 18 arranged to coincide with the side tube 2. The mesh 15 functions in the operation of the tube as an ion trap and is maintained at the same potential as the cylinder 16 which extends over a considerable area of the internal wall of the envelope and functions as an anode electrode by being connected to a positive potential of for example 280 volts with respect to the cathode 8.

A tantalum boat 19 containing a quantity of photo-conductive material 20 such as antimony tri-sulphide and provided with suitable means for heating it to cause evaporation of the material 20 is inserted through the side tube 2 and aperture 18 so that it is positioned with its open side facing the mesh 15 and the conducting coating 14.

With the side tube 2 closed the envelope 1 is filled with a gas such as xenon to a pressure of approximately 0.4 mm. Hg and the boat 19 is heated so that the whole of the material 20 is evaporated. The antimony tri-sulphide will thus deposit through the mesh 15 to form a porous or spongy base layer 21 over the coating 14. During this evaporation only part of said material will deposit on the coating 14, part of it being deposited on the bars of the mesh 15 and the remainder on the inside surface of the tubular wall of the cylindrical anode 16 over a band about 1 inch wide and approximately symmetrical to the plane of the evaporator boat 19 and normal to the axis of the envelope 1. The boat 19 is removed, the side tube 2 sealed off, and the envelope 1 evacuated via stem 7 after which the anode 16 and mesh 15 are inductively heated so as to re-evaporate the material from the anode 16 and mesh 15 and deposit it as a solid layer 22 on the spongy base layer 21. During this latter evaporation the window 3 is maintained cool by applying water to the outer surface of the window portion of the envelope. The pump stem 7 is then sealed off.

It will be understood that in utilising a tube as above described the various potentials already mentioned will be applied to the electrodes and the cathode heated to its electron emitting temperature. A light image will be projected through the window 3 onto the sensitive surface formed by the layers 21 and 22. Externally of the tube there will be provided magnetic focussing means for forming the electrons from the gun into a well defined beam and magnetic means for scanning the electron beam in an orthogonal manner over the surface of the layer 22. The scanning beam has a low velocity and therefore reduces the positive charges which will be set up on the gun side of the layer 22 down to a datum potential, at or near that of the cathode 8 of the tube and causes signal currents to flow to the signal electrode layer 14.

The combining of a porous layer with a solid layer as described gives the surprising result of providing a layer having a capacitance lag which is considerably smaller than the spongy layer alone and even smaller than would be expected by connecting in series the high capacitance of a solid layer with the lower capacitance of a spongy layer. It is believed that the solid material 22 bridges the gaps between the particles of the spongy layer 21 thereby reducing the effective depth of penetration of the scanning electrons and therefore reducing the effective capacitance of the combined layer.

It is found that the colour response of a porous layer of antimony tri-sulphide alone is poor in the red end of the spectrum whilst that of a solid layer alone of the same material is extremely high in the red end of the spectrum. However the combined layer as proposed by the invention has a colour response intermediate to that of the two constituent layers which provides a very suitable characteristic for a practical television tube.

Although antimony tri-sulphide has been mentioned by way of example other photo-conductive materials such as zinc selenide, cadmium sulphide, cadmium selenide, or germanium sulphide may be employed to furnish either the spongy or solid layer or both to form the proposed composite layer.

The proportion of the photo-conductive material deposited on the coating 14 as a spongy base layer 21 to the amount deposited as the solid second layer 22 depends on the gas pressure, the shadow ratio of the mesh 15 and on the extent to which the mesh 15 becomess clogged during the first evaporation process. This proportion is important in relation to the capacitance, the photo-conductive lag and sensitivity of the layer. On the other hand, the base layer is required to be of a certain thickness to ensure low capacitance and this can be controlled by the amount of photo-conductive material 20 present in the boat 19 during the first evaporation in relation to the shadow ratio of the mesh 15. Further, the amount which will deposit on the bars of the mesh 15 can be estimated but the amount deposited on the inner wall of the anode 16 is found to vary somewhat so that the thickness of the solid layer 21 may vary from tube to tube. The thickness of the solid layer 21 is found to be fairly critical in determining the ultimate photo-conductive lag and sensitivity of the tube.

According to another feature of the invention means are provided for modifying the surface area of the anode 16 so as to control the amount of spongy material deposited thereon during the first evaporation.

This can be arranged by controlling the surface area of the anode 16 which is exposed to the first evaporation, as by cutting apertures therein so that some of the photo-conductive material will be evaporated through the apertures onto the inner glass wall of the envelope 1 of the tube, and as the envelope is not heated during the formation of the second layer 22 the material on the wall will not be re-evaporated. The apertures may be of any desired form such as windows or perforations so as to produce the required surface area to provide the required amount of photo-conductive material for re-evaporation.

It should be mentioned that care must be taken during operation of the tube to prevent the isolated areas of antimony trisulphide on the wall of the tube from becoming charged to random potentials and thereby causing distortions in the geometry of the scanning raster. For this reason the reduction of the surface area of the anode 16 by the provision of one or more windows will not be effective unless these windows are suitably formed. Various suitable ways of constructing the apertures in the cylinder 16 are shown in FIGURES 3, 4 and 5. In FIGURE 3 the upper end of the cylinder 16 is constructed with a series of apertures 23 each of which is covered with a high transparency metal mesh 24.

In FIGURE 4 similar apertures 23 are shown but in this example they are provided with spring loaded flaps 25 hinged at *25a* and held in the open position by a spring ring 26. In this arrangement the flaps 25 are held in the position shown until after the removal of the boat 19 and formation of the second layer 22. They are released by gently tapping the tube to cause the ring 26 to slide down the cylinder 16 the flaps 25 then rotating about their hinges to completely cover the apertures 23. With both of these arrangements the screening action of the envelope wall by anode 16 is substantially unimpaired so that the scanning fields are not disturbed. To obtain a symmetrical arrangement, it is preferred as shown in FIGURE 5 to provide the anode 16 with uniformly distributed apertures 27. An anode 16 of the form shown in FIGURE 5 for a typical tube of the above construction may have the following dimensions. Diameter of 0.8 inch and length of 3 inches having an annular portion at one end of length 0.75 inch provided with apertures of 0.040 inch diameter spaced uniformly so that the solid area of the wall of the anode 16 is reduced by the apertures by approximately 50 percent at the end thereof adjacent to the mesh 15.

Where the material employed for the formation of the anode 16 in any of the above constructions is a metal or metal alloy which reacts with the photo-conductive material employed then the portions of this anode 16 on which photo-conductive material is evaporated and also if desired the mesh 15 may be coated with an inert material such as rhodium, gold, platinum, palladium or iridium as more fully disclosed in the specification of U.S. Patent No. 2,905,843, patented September 22, 1959.

Although the invention has been described as applied to the construction of a pick-up tube which is very suitable for operation with low velocity scanning, the invention is also applicable to pick-up tubes adapted to operate with high velocity scanning and generally to devices having a photo-sensitive layer formed of a photo-conductive material.

What I claim is:

1. A method of forming in a device a photo-conductive layer on the surface of a support formed of translucent insulating material, comprising providing within said device a metal mesh electrode adjacent to and facing said support surface, an evaporator containing photo-conductive material arranged facing the side of said mesh remote from said support, introducing a gas into said device at such a pressure and heating said evaporator to cause said material to be evaporated and to deposit on said mesh and said support surface as a porous layer, evacuating said device and then heating said mesh to cause the porous deposit thereon to be re-evaporated and to deposit on said support a solid layer of said material over said porous layer.

2. A method of forming in a device a photo-conductive layer on the surface of a support formed of translucent insulating material, comprising providing within said device a cylindrical metal electrode having at one end thereof a metal mesh electrode arranged tranversely of said electrode adjacent to and facing said support surface, an evaporator containing photo-conductive material arranged facing the side of said mesh remote from said support, introducing a gas into said device at such a pressure and heating said evaporator to cause said material to be evaporated and to deposit on said metal electrode, said mesh and said support surface as a porous layer, evacuating said device and then heating said metal electrode and mesh to cause the porous deposit thereon to be re-evaporated and to deposit on said support a solid layer of said material over said porous layer.

3. A method of forming in a device a photo-conductive layer on the surface of a support formed of translucent insulating material, comprising providing within said device a cylindrical metal electrode having apertures in its wall and a metal mesh electrode arranged transversely of said electrode adjacent to and facing said support surface, an evaporator containing photo-conductive material arranged facing the side of said mesh remote from said support, introducing gas into said device at such a pressure and heating said evaporator to cause said material to be evaporated and to deposit on said metal electrode said mesh and said support surface as a porous layer, evacuating said device and then heating said metal electrode and mesh to cause the porous deposite thereon to be re-evaporated and to deposit on said support a solid layer of said material over said porous layer, the apertures in said metal electrode governing the material deposited thereon during the first evaporation and thereby the amount of material available for re-evaporation thereby to control the thickness of said solid layer.

4. A method according to claim 3, wherein said apertures in said metal electrode are few in number and are covered by a foraminous metal member.

5. A method according to claim 3, wherein said apertures are provided with flaps which are capable of being moved so as to substantially cover said apertures.

6. A method according to claim 3, wherein the end of said metal electrode nearer said mesh is formed with a large number of uniformly distributed apertures.

7. A method according to claim 3, wherein the end portion of said metal electrode nearer said mesh is formed with a large number of apertures which reduce the solid area of said end portion by approximately 50 percent.

References Cited in the file of this patent

UNITED STATES PATENTS

| | | |
|---|---|---|
| 2,746,831 | Chapman | May 22, 1956 |
| 2,818,831 | Vine | Jan. 7, 1958 |
| 2,967,254 | Forgue | Jan. 3, 1961 |
| 2,967,962 | Turk | Jan. 10, 1961 |